Figure 1:
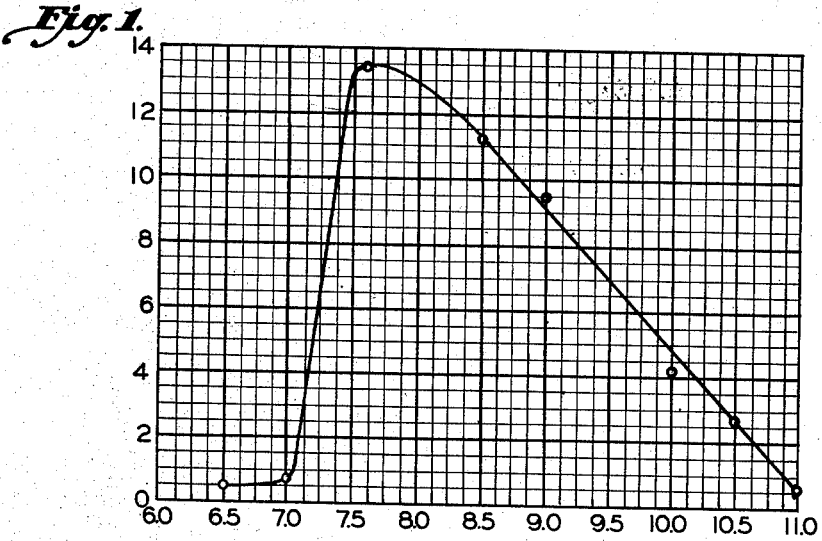

Aug. 20, 1957 P. Z. ANTHONY ET AL 2,803,654
PREPARATION OF THYROXINE PRODUCTS
Filed June 24, 1955

PAUL Z. ANTHONY
DANIEL R. BORGEN
LEONARD G. GINGER
INVENTORS

BY Jerome F. Fallon

United States Patent Office 2,803,654
Patented Aug. 20, 1957

2,803,654

PREPARATION OF THYROXINE PRODUCTS

Paul Z. Anthony, Morton Grove, Daniel R. Borgen, Mount Prospect, and Leonard G. Ginger, Skokie, Ill., assignors to Baxter Laboratories, Inc., Morton Grove, Ill.

Application June 24, 1955, Serial No. 517,794

14 Claims. (Cl. 260—519)

This invention relates to a process for producing thyroxine products, and more particularly to a process for producing such thyroxine products from an N-acyldiiodotyrosine.

This application is a continuation-in-part of our co-pending application Serial No. 367,502, filed July 13, 1953, now abandoned.

Thyroxine, in the form of the levo isomer, is an important hormone which is used in treating such human ailments as myxedema, cretinism, obesity, etc. This invention provides for the preparation of this hormone in such quantity as to supplement and perhaps eventually replace crude, biologically-variable, disiccated thyroid tissue. This invention also provides for the preparation of D-thyroxine, which is regarded as the unnatural form of the thyroid hormone, in contrast to the L-isomer. Therapeutic usage of the L-isomer constitutes replacement therapy in pathological conditions characterized by decreased function of the thyroid gland, that is, hypothyroidism.

This existing work in the art, which is primarily concerned with producing L-thyroxine, has shown that the so-called "digestive coupling reaction" in which diiodotyrosine yields thyroxine proceeds best by incubation in an alkaline solution at pH 8.5 to 11 and at a temperature of the order of 60° C. in the presence of a manganese catalyst with stirring under conditions in which the surface of the solution is exposed to an oxygen-containing gas or by passing air through the solution.

Other work in the art on this digestive coupling reaction has shown that the incorporation of protective groupings on the amino group or on the amino and carboxyl groups of diiodotyrosine may be desirable. In particular, research workers in this field have shown that the digestive coupling reaction in which N-acetyldiiodotyrosine yields N-acetylthyroxine proceeds best by incubation in a borate buffer solution at pH 7.6 and at a temperature of 37° C. No informatoin is available on other reaction conditions that might affect this digestive coupling reaction.

There is considerable confusion in the existing literature in this field concerning expression of yield. Many investigators have determined the percentage yield in the digestive coupling reaction involving the conversion of diiodotyrosine to thyroxine by subtracting the amount of recoverable diiodotyrosine from the starting amount and assuming that the difference represents the diiodotyrosine capable of entering into the digestive coupling reaction. In actuality, and for all practical purposes, the yield should be based on the initial amount of diiodotyrosine that is employed. Yields as specified herein will all be in terms of the latter manner of calculation. Such a calculation can effect a significant change in the yields reported by other research workers who employed the other method of yield computation; for example, in U. S. 2,435,947, the maximal net yield of thyroxine obtained at the optimal incubation conditions was 2.8%. Recalculation, based on the total starting amount of diiodotyrosine, gives a gross yield of only 0.85%.

The one reported study concerning the digestive coupling reaction involving the conversion of N-acetyldiiodotyrosine to N-acetylthyroxine involved the same time of yield calculation described above, that is, the maximal net yield under optimal conditions was 27%, whereas the gross yield, which must be used for comparison with our yield data, was 3.6%. Furthermore, the period of time required for this coupling reaction was twelve days.

Important in the production of the effective calorigenic hormone is the removal of the N-acyl substituent which, although significant in the attainment of high yield in the coupling step, lessens the therapeutic efficacy of the product.

An object of the present invention is to provide a process for the production of thyroxine in which the time period required is substantially reduced in comparison to prior art processes, at the same time producing a superior yield. A more specific object is to provide a process for the production of thyroxine in which the digestive coupling reaction step (as where an N-acyldiiodotyrosine yields an N-acylthyroxine) is accomplished in a greatly reduced time through the use of optimal catalyst concentrations, optimal temperature conditions, and optimal pH range. A further object is to employ in such process the use of substantially pure oxygen in combination with an optimal catalyst concentration, optimal temperature conditions, and optimal pH range, and for a selected optimal reaction time. A still further object is to provide an improved process for the preparation of L-thyroxine, D-thyroxine r DL-thyrozine from the L-, D-, or DL-isomers, respectively, of N-acyldiiodotyrosine through a novel combination of steps greatly increasing the yield within a minimum period of time. Other specific objects and advantages will appear as the specification proceeds.

Certain phases of the invention are illustrated in the accompanying drawing, in which—

Figure 2:
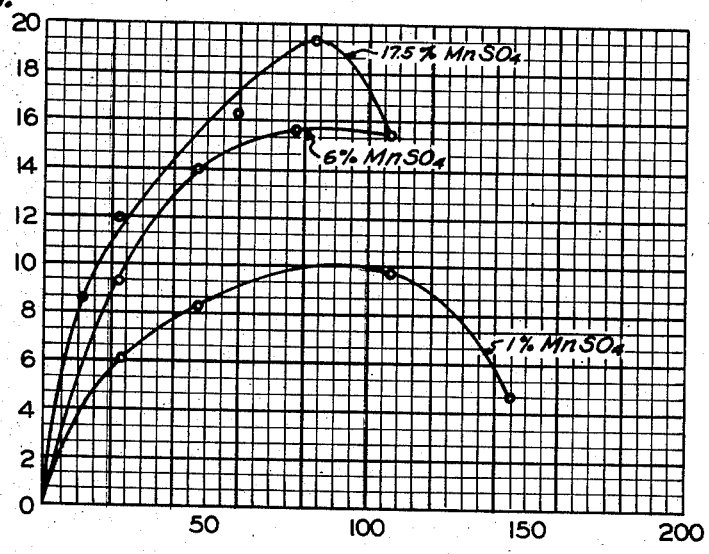

Fig. 1 is a graph illustrating by a curve the percent of yield of N-acetylthyroxine under different pH values; and Fig. 2 is a graph indicating by curves the percent yield of N-acetylthyroxine under different reaction times.

In one embodiment of our invention, an N-acyldiiodotyrosine is suspended in a boric acid solution and the solid dissolved, preferably by adjusting the pH to about 7.0 to 11.0 with sodium hydroxide. Up to 50% (by weight) of a catalyst such as manganese sulfate, manganese oxide or other salts of manganese, is added and the solution heated to about 37 to 65° C. for a period preferably up to ninety-six hours but not over 150 hours. After this period of time, the sodium salt of the N-acylthyroxine which has precipitated is collected. The salt may then be decomposed with dilute acid to yield N-acylthyroxine. Hydrolysis of the N-acylthyroxine to thyroxine is achieved by boiling in concentrated hydrochloric acid and glacial acetic acid.

The economic importance and other advantages of reducing the time period for digestive coupling to less than ninety-six hours, as realized by our process, are obvious. Further, the process described, in which optimal digestive coupling conditions are maintained, gives consistently high yields (up to 20%) of the N-acylthyroxine intermediate product. The process thus affords a practicable method for the production of the pure, biologically-active hormone, L-thyroxine, as well as the other optical isomers in yields which are commercially feasible.

The digestive coupling step of our process can be expressed in terms of the following structural equation, wherein R is an acyl radical:

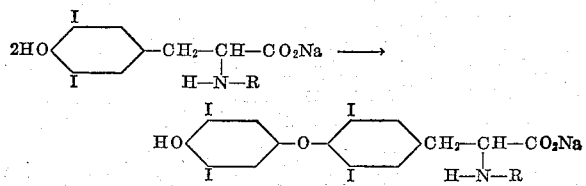

In the subsequent hydrolysis step, the acyl radical (R in the equation above) is replaced by hydrogen.

As already indicated, the process of this invention also provides an excellent method for the preparation of D-thyroxine. When L-thyroxine is desired, the starting material will be N-acyl-L-diiodotyrosine; when D-thyroxine is desired, the starting material will be N-acyl-D-diiodotyrosine; and when DL-thyroxine is desired, the starting material will be N-acyl-DL-diiodotyrosine.

The desirability of agitating the incubation reaction mixture by passing an oxygen-containing gas (air) through the mixture to improve the yield of the N-acylthyroxine intermediate product, has been heretofore suggested. The stated requirement was that it was only necessary to stir the digestive solution with its surface exposed to any oxygen-containing gas. We have carried through experiments in which, instead of employing air, and instead of subjecting a surface of the solution to air, substantially pure oxygen was bubbled into the digestion solution. Under conditions where no catalyst, or very minute quantities of catalyst, were employed, it was found that there was no significant difference in the yields associated with aeration and with oxygenation. However, we discovered that when the catalyst was increased within said limits, oxygenation then produced greatly increased yields. Similarly, we discovered that the yields were further increased by employing a selected temperature range in combination with the use of oxygen and the increased amounts of catalyst. This superiority of oxygenation over aeration was entirely unexpected, because the existing work in the art, at least insofar as the digestive coupling reaction in which diiodotyrosine yields thyroxine is concerned, points out that it is only necessary to stir the digestive solution with its surface exposed to any oxygen-containing gas.

The following table sets forth results of experiments in which the digestive coupling reaction step is carried out in a borate buffer solution at about pH 7.6 using the acetyl form of N-acyldiiodotyrosine to yield the acetyl form of N-acylthyroxine, and in which aeration or oxygenation was employed in the presence of varied amounts of catalyst:

TABLE I

*Comparison of air with oxygen*

| Experiment No. | Treatment | Temp., °C. | Catalyst | Percent N-acetyl-thyroxine (24 hrs.) |
|---|---|---|---|---|
| 1 | aeration | 37 | none | 1.1 |
| 2 | oxygenation | 37 | do | 1.3 |
| 3 | aeration | 37 | 1.0% MnSO$_4$ | 3.0 |
| 4 | oxygenation | 37 | do | 5.1 |
| 5 | aeration | 50 | none | 2.1 |
| 6 | oxygenation | 50 | do | 3.5 |
| 7 | aeration | 50 | 1.0% MnSO$_4$ | 4.0 |
| 8 | oxygenation | 50 | do | 6.3 |

The following table illustrates the effect of temperature under conditions of oxygenation in which no catalyst is employed, in which a low amount of catalyst is employed and in which a large amount of catalyst is employed:

TABLE II

*Effect of temperature*

| Experiment No. | Temp. (°C.) | Catalyst | Percent N-acetyl-thyroxine (24 hrs. with oxygenation) |
|---|---|---|---|
| 9 | 25 | none | 0.04 |
| 10 | 37 | do | 0.3 |
| 11 | 44 | do | 2.2 |
| 12 | 50 | do | 3.0 |
| 13 | 55 | do | 3.3 |
| 14 | 60 | do | 0.5 |
| 15 | 70 | do | 0.2 |
| 16 | 25 | 1.0% MnSO$_4$ | 0.8 |
| 17 | 37 | do | 5.1 |
| 18 | 44 | do | 6.0 |
| 19 | 50 | do | 6.9 |
| 20 | 55 | do | 8.7 |
| 21 | 60 | do | 1.1 |
| 22 | 70 | do | 1.6 |
| 23 | 24 | 17.5% MnSO$_4$ | 4.7 |
| 24 | 37 | do | 8.5 |
| 25 | 44 | do | 12.0 |
| 26 | 60 | do | 13.3 |
| 27 | 65 | do | 10.3 |
| 28 | 70 | do | 5.0 |

It can be seen in Table II that a maximal yield is obtained at 50 to 55° C. when no catalyst is present (Experiments 12 and 13). Enhancing the digestive coupling reaction by adding catalyst broadens the permissible temperature range somewhat: for example, with 1% manganese sulfate, a temperature range of 37 to 55° C. is favorable (Experiments 17 to 20), and with 17.5% manganese sulfate, a temperature range 37 to 65° C. permits good yields (Experiments 24 to 27). It is noteworthy that the existing work in the art, insofar as the digestive coupling reaction in which diiodotyrosine yields thyroxine is concerned, demands an incubation at 50 to 70° C.; however, the yield curve reveals that a maximal yield is obtained at 60° C. with sharply decreasing yields at the limits of the range of 50 to 70° C. claimed. In our new process involving both oxygenation of and addition of catalyst to the digestive coupling reaction step in which an N-acyldiiodotyrosine yields an N-acylthyroxine, a broad temperature range of 37 to 65° C. is permissible, and, furthermore, yields are uniformly high over the entire temperature range. Consequently, it is possible to prepare the desired intermediate N-acylthyroxine, without the necessity of very carefully controlling the temperature within a narrow range.

The existing work in the art, at least insofar as the digestive coupling reaction in which diiodotyrosine yields thyroxine is concerned, indicates that the concentration of catalyst used is not critical. Equally satisfactory results are claimed when the manganese-containing catalyst is added in amounts equivalent to 0.1 to 20% by weight of the diiodotyrosine. Similarly, starting with N-acetyldiiodotyrosine the existing art indicates that, when the amount of oxygen is adequate, the presence of a catalyst (manganese-containing) does not increase the yield of thyroxine. On the contrary, we have found that in the digestive coupling reaction step in which N-acyldiiodotyrosine yields N-acylthroxine, the concentration of the catalyst is critical. Our studies on catalyst concentration are illustrated in Table III below. It is to be noted that, under conditions of oxygenation and at a reaction temperature of 44° C., as the catalyst concentration is increased from an initial value of 0% in stepwise manner to 50% (based on weight of N-acetyldiiodotyrosine used), the yields of N-acetylthyroxine obtained increase progressively, reaching a maximal value of 13.4% at a catalyst concentration of 17.5 to 20%, although 10% catalyst concentration gives a yield almost as good. An increase of catalyst concentration beyond 20%, however, fails to improve the yield (Experiments 29 to 36). It is noteworthy that a catalyst concentration of 15.6% represents an equimolar quantity which suggests that the so-called "catalyst" is in actuality a reactant. When a similar series of experiments involving stepwise increase in catalyst concentration are conducted at 50° C., very similar results are obtained (Experiments 37 to 42).

If the above results are plotted upon a graph, it will be found that the yield of N-acetylthyroxine is increased sharply when the catalyst is increased to about 10 to 20%. At about 20%, the curve flattens out, and there is no gain in yield when the percentage of catalyst is increased above 20% (by weight).

TABLE III

*Effect of catalyst concentration*

| Experiment No. | Temp. (° C.) | Catalyst (Percent $MnSO_4$) | Percent N-acetyl-thyroxine (24 hrs. with oxygenation) |
| --- | --- | --- | --- |
| 29 | 44 | 0 | 2.2 |
| 30 | 44 | 1 | 6.0 |
| 31 | 44 | 5 | 9.6 |
| 32 | 44 | 10 | 12.0 |
| 33 | 44 | 17.5 | 13.4 |
| 34 | 44 | 20 | 13.4 |
| 35 | 44 | 35 | 12.7 |
| 36 | 44 | 50 | 13.3 |
| 37 | 50 | 0 | 2.6 |
| 38 | 50 | 1 | 6.9 |
| 39 | 50 | 5 | 11.2 |
| 40 | 50 | 10 | 11.3 |
| 41 | 50 | 20 | 13.5 |
| 42 | 50 | 35 | 12.4 |

It was of importance to determine whether the addition of 17.5% of catalyst (an amount known to give optimal yields) to the digestive coupling reaction step would in any manner alter the superiority of oxygenation over aeration. In addition, the possibility of simple, vigorous, mechanical agitation so as to incorporate air from the surrounding environment, was investigated. The yields illustrated in Table IV show definitely that oxygenation gives greatly superior results.

TABLE IV

*Comparison of stirring, aeration and oxygenation*

| Experiment No. | Experimental Conditions | Percent N-acetyl-thyroxine [1] |
| --- | --- | --- |
| 43 | stirring | 5.3 |
| 44 | air | 7.2 |
| 45 | oxygen | 12.0 |

[1] 24 hours at 44° C. in the presence of 17.5% $MnSO_4$.

The manganese-containing catalyst is preferably manganese sulfate or other manganese salts capable of providing manganese ions in solution. However, other manganese-containing catalysts can be employed, such as manganese oxide, etc.

The existing work in the art, at least insofar as the digestive coupling reaction in which diiodotyrosine yields thyroxine is concerned, indicates that a pH range of 8.5 to 11.0 is essential. It has been reported that the digestive coupling reaction, in which N-acetyldiiodotyrosine yields N-acetylthroxine gives a maximal gross yield of 2.3% at a pH of 7.25. The art also shows that a maximal gross yield (in solution) of approximately 4.7% is obtained in the latter reaction at a pH of 8 to 9 with no catalyst dependence. Since it is impossible, on isolation, to approach yield in solution, comparison of such a yield with isolated yield is not realistic.

In our studies on the latter coupling reaction, we have investigated a pH range of 6.5 to 11.0. The nature of the dependence of yield on pH under our coupling conditions, involving oxygenation at 44° C. in the presence of 17.5% catalyst for 24-hour periods, is illustrated in Fig. 1 of the drawings. It is apparent that there is a particularly sharp increase in the yield of N-acetyl-thyroxine when the coupling pH is raised from 7.0 to 7.6. The yield then gradually diminishes as the pH is increased in small increments to pH 11.0. Although the best yields are obtained at pH 7.15 to 10.0, and particularly at pH 7.6 (12 to 14%), the feasible range for the coupling reaction as carried out under our optimal conditions is 7.0 to 11.0. Thus, by our new process, it is possible to carry out the reaction over a broad pH range.

In our various studies we have shown that under our optimal coupling conditions, the yield of N-acetylthyroxine obtained within 24 hours, increases with increasing amounts of catalyst up to an equimolar quantity of catalyst. We have further studied the effect of various catalyst concentrations upon the yield of N-acetylthyroxine obtainable when the reaction time is extended well beyond 24 hours. The results are illustrated graphically in Fig. 2 of the drawings. The reactions were conducted under conditions involving oxygenation at a pH of 7.6 and at a temperature of 44° C. It can be seen that at various catalyst concentrations, the maximal yields are obtained at approximately 96 hours, although periods up to 150 hours may be practical. The best yield is realized with at least an equimolar catalyst concentration (19.5% yield at a catalyst concentration of 17.5%). At catalyst concentrations decreasing in stepwise manner from an equimolar quantity, the yields of N-acetylthyroxine becomes progressively less, although the maxima still occur at approximately 96 hours. From the curves, it is apparent that most of the N-acetylthyroxine obtainable is formed within the first 48 hours and that the rate of formation decreases over the next 48 hours. At digestion times beyond 96 hours, the yield of N-acetylthyroxine falls precipitously, presumably due to a secondary decomposition reaction.

Many experiments incorporating the best conditions described above were conducted. At a temperature of 44° C., a pH of 7.6, a catalyst concentration of 17.5% and under conditions of oxygenation, stepwise increases in yield are obtained, with relation to time, reaching a maximum of 15 to 20% in less than 96 hours. Thus, for the first time, a digestive coupling procedure is available which provides a practicable method for producing the important hormone, thyroxine.

In other experiments using other forms of N-acyldiiodotyrosine than acetyl, we have found that equally good yields of the N-acylthyroxine intermediate are achieved when employing the optimal conditions described above. The specific acyl variants tested were propionyl, butyryl and benzoyl. In each case these N-acyldiiodotyrosines were subjected to a digestive coupling to provide the yields of N-acylthyroxine shown in Table V.

TABLE V

*Coupling of various acyl derivatives [1]*

| Acyl Form | Catalyst (Percent $MnSO_4$) | Time (Hr.) | Percent N-acyl-thyroxine |
| --- | --- | --- | --- |
| Propionyl | 15.0 | 24 | 13.8 |
| Butyryl | 15.0 | 24 | 11.0 |
| Benzoyl | 6.0 | 48 | 14.1 |
| Benzoyl | 6.0 | 101 | 20.0 |

[1] At 44° C. and pH 7.6 with oxygenation.

Specific examples of the process may be set out as follows:

EXAMPLE 1

A 9.5 g. portion of N-acetyl-L-diiodotyrosine was suspended in 100 ml. of 0.05 M boric acid ($H_3BO_3$) and the solid dissolved by adjusting the pH to 7.6 with 2 N sodium hydroxide (NaOH). A 17.5% (by weight) portion of manganese sulfate was added and the solution heated at 44° C. under conditions of oxygenation. After approximately 24 hours of incubation, the sodium salt of N-acetyl-L-thyroxine which precipitated was collected. The salt was decomposed with dilute acid to yield 1.08 g. (13.4%) expressed as pure N-acetyl-L-thyroxine, which was hydrolyzed (acetyl group removed) by refluxing in glacial acetic acid-hydrochloric acid (approximately 2:1) to yield L-thyroxine.

EXAMPLE 2

A 37.0 g. portion of N-acetyl-D-diiodotyrosine was suspended in 400 ml. of 0.05 M boric acid ($H_3BO_3$) and the solid dissolved by adjusting the pH to 7.6 with 2 N sodium hydroxide (NaOH). A 17.5% (by weight) portion of manganese sulfate was added and the solution heated at 44° C. under conditions of oxygenation. After approximately 48 hours of incubation, the sodium salt of N-acetyl-D-thyroxine which precipitated was collected. The salt was decomposed with dilute acid to yield 3.73 g. (12%) expressed as pure N-acetyl-D-thyroxine which was hydrolyzed (acetyl group removed) by refluxing in glacial acetic acid-hydrochloric acid (approximately 2:1) to yield D-thyroxine.

EXAMPLE 3

A 9.78 g. portion of N-propionyl-L-diiodotyrosine was suspended in 100 ml. of 0.05 M boric acid ($H_3BO_3$) and the solid dissolved by adjusting the pH to 7.6 with 2 N sodium hydroxide (NaOH). A 15.0% (by weight) portion of manganese sulfate was added and the solution heated at 44° C. under conditions of oxygenation. After approximately 24 hours of incubation, the sodium salt of N-propionyl-L-thyroxine which precipitated was collected. The salt was decomposed with dilute acid to yield 13.8% product expressed as pure N-propionyl-L-thyroxine, which was hydrolyzed (propionyl group removed) by refluxing in glacial acetic acid-hydrochloric acid (approximately 2:1) to yield L-thyroxine.

EXAMPLE 4

A 10.06 g. portion of N-butyryl-L-diiodotyrosine was suspended in 100 ml. of 0.05 M boric acid ($H_3BO_3$) and the solid dissolved by adjusting the pH to 7.6 with 2 N sodium hydroxide (NaOH). A 15.0% (by weight) portion of manganese sulfate was added and the solution heated at 44° C. under conditions of oxygenation. After approximately 24 hours of incubation, the sodium salt of N-butyryl-L-thyroxine which precipitated was collected. The salt was decomposed with dilute acid to yield 11.0% of product expressed as pure N-butyryl-L-thyroxine, which was hydrolyzed (butyryl group removed) by refluxing in glacial acetic acid-hydrochloric acid (approximately 2:1) to yield L-thyroxine.

EXAMPLE 5

A 9.7 g. portion of N-benzoyl-L-diiodotyrosine was suspended in 100 ml. of 0.05 M boric acid ($H_3BO_3$) and the solid dissolved by adjusting the pH to 7.6 with 2 N sodium hydroxide (NaOH). A 6.0% (by weight) portion of manganese sulfate was added and the solution heated at 44° C. under conditions of oxygenation. After approximately 101 hours of incubation, the sodium salt of N-benzoyl-L-thyroxine which precipitated was collected. The salt was decomposed with dilute acid to yield 20.0% of product expressed as pure N-benzoyl-L-thyroxine, which was hydrolyzed (benzoyl group removed) by refluxing in glacial acetic acid-hydrochloric acid (approximately 2:1) to yield L-thyroxine.

While in the foregoing specification we have set forth specific examples of the process in considerable detail for the purpose of illustrating embodiments of the invention, it will be understood that such details may be varied widely by those skilled in the art without departing from the spirit of our invention.

We claim:
1. In the process for the production of an N-acylthyroxine from an N-acyldiiodotyrosine wherein the N-acyldiiodotyrosine is incubated in an alkaline aqueous solution at a pH and temperature favoring conversion of the N-acyldiiodotyrosine to N-acylthyroxine, the improvement comprising carrying out said incubation for a period of from about 24 to 150 hours in the presence of from about 1 to 20% by weight based on the weight of the N-acyldiiodotyrosine, of a manganese-containing catalyst for said conversion and passing substantially pure oxygen through said aqueous solution during said conversion.

2. In the process for the production of an N-acetylthyroxine from an N-acetyldiiodotyrosine wherein the N-acetyldiiodotyrosine is incubated in an alkaline aqueous solution at a pH and temperature favoring conversion of the N-acetyldiiodotyrosine to N-acetylthyroxine the improvement comprising carrying out said incubation for a period of from about 24 to 150 hours in the presence of from about 1 to 20% by weight, based on the weight of the N-acetyldiiodotyrosine, of a manganese-containing catalyst for said conversion and passing substantially pure oxygen through said aqueous solution during said conversion.

3. In a process for the production of an N-acylthyroxine from an N-acyldiiodotyrosine, the step of incubating for a period of from about 24 to 150 hours the N-acyldiiodotyrosine in an alkaline solution having a pH of 7.0 to 11.0 in the presence of a manganese-containing catalyst while passing substantially pure oxygen through the solution and while maintaining the temperature in the range of 37° to 65° C., said catalyst being employed in an amount ranging from about 1 to 20% by weight based on the weight of the N-acyldiiodotyrosine used.

4. In a process for the production of an N-acetylthyroxine from an N-acetyldiiodotyrosine, the step of incubating for a period of from about 25 to 150 hours the N-acetyldiiodotyrosine in an alkaline solution having a pH of 7.0 to 11.0 in the presence of a manganese-containing catalyst while passing substantially pure oxygen through the solution and while maintaining the temperature in the range of 37° to 65° C., said catalyst being employed in an amount ranging from about 1 to 20% by weight based on the weight of the N-acetyldiiodotyrosine used.

5. In a process for the production of an N-acetylthyroxine from an N-acetyldiiodotyrosine, the step of incubating the N-acetyldiiodotyrosine in an alkaline solution having a pH of 7.2 to 10.0 in the presence of a manganese-containing catalyst while passing substantially pure oxygen through the solution and while maintaining the temperature in the range of 37° to 65° C., said catalyst being employed in an amount ranging from about 10 to 20% by weight based on the weight of the N-acetyldiiodotyrosine used.

6. The process step of claim 5 in which the N-acetyl-L-thyroxine is prepared from N-acetyl-L-diiodotyrosine.

7. The process step of claim 5 in which N-acetyl-D-thyroxine is prepared from N-acetyl-D-diiodotyrosine.

8. In a process for the production of an N-acetylthyroxine from an N-acetyldiiodotyrosine the step of incubating the N-acetyldiiodotyrosine in an alkaline solution having a pH of 7.0 to 11.0 in the presence of a manganese salt catalyst while passing substantially pure oxygen through the solution and while maintaining the temperature in the range of 37° to 65° C., the catalyst being employed in an amount ranging from about 10 to 20% by weight based on the weight of N-acetyldiiodotyrosine used.

9. The process step of claim 8, in which N-acetyl-L-thyroxine is prepared from N-acetyl-L-diiodotyrosine.

10. The process step of claim 8, in which N-acetyl-D-thyroxine is prepared from N-acetyl-D-diiodotyrosine.

11. The process step of claim 8, in which the said catalyst is manganese sulfate.

12. In a process for the production of an N-acetyl-thyroxine from an N-acetyl-diiodotyrosine, the step of incubating the N-acetyldiiodotyrosine in an alkaline solution having a pH of 7.2 to 10.0 in the presence of a manganese sulfate catalyst while passing substantially pure oxygen through the solution and while maintaining the temperature in the range of 37° to 65° C., about an equimolar concentration of said catalyst being employed based on the N-acetyldiiodotyrosine.

13. In a process for the production of an N-acetyl-thyroxine from an N-acetyl-diiodotyrosine, the step of incubating the N-acetyldiiodotyrosine in an alkaline solution having a pH of 7.0 to 11.0 in the presence of a manganese containing catalyst while passing substantially pure oxygen through the solution and while maintaining the temperature in the range of 37° to 65° C., said catalyst being employed in approximately an equimolar concentration.

14. In a process for the production of an N-acetyl-thyroxine from an N-acetyldiiodotyrosine wherein the N-acetyldiiodotyrosine is incubated in an alkaline aqueous solution at a pH and temperature favoring conversion of the N-acetyldiiodotyrosine to N-acetylthyroxine, the improvement comprising carrying out said incubation in the presence of at least 10% by weight, based on the weight of N-acetyldiiodotyrosine, of a manganese containing catalyst for said conversion and passing substantially pure oxygen through said aqueous solution during said conversion.

References Cited in the file of this patent

UNITED STATES PATENTS

| | | |
|---|---|---|
| 2,435,947 | Turner et al. | Feb. 10, 1948 |
| 2,478,065 | Turner et al. | Aug. 2, 1949 |
| 2,642,426 | West et al. | June 16, 1953 |

FOREIGN PATENTS

| | | |
|---|---|---|
| 149 992 | Australia | Feb. 11, 1953 |